(12) United States Patent
Bethea et al.

(10) Patent No.: US 12,278,585 B2
(45) Date of Patent: Apr. 15, 2025

(54) VALVE ACTUATOR WITH DC BRAKING SYSTEM

(71) Applicant: TRI-TEC MANUFACTURING, LLC, Kent, WA (US)

(72) Inventors: Christopher Matthew Bethea, Kent, WA (US); Richard Peter Braun, Kent, WA (US); Seth Axel Coady, Kent, WA (US)

(73) Assignee: Tri-Tec Manufacturing, LLC, Kent, WA (US)

( * ) Notice: Subject to any disclaimer, the term of this patent is extended or adjusted under 35 U.S.C. 154(b) by 316 days.

(21) Appl. No.: 17/890,076

(22) Filed: Aug. 17, 2022

(65) Prior Publication Data

US 2023/0139060 A1 May 4, 2023

Related U.S. Application Data

(60) Provisional application No. 63/274,864, filed on Nov. 2, 2021.

(51) Int. Cl.
*H02P 3/08* (2006.01)
*F16K 3/22* (2006.01)
*F16K 31/04* (2006.01)
*F16K 37/00* (2006.01)
*H02P 6/24* (2006.01)

(52) U.S. Cl.
CPC .............. *H02P 3/08* (2013.01); *F16K 31/042* (2013.01); *F16K 37/0041* (2013.01); *H02P 6/24* (2013.01); *F16K 3/22* (2013.01)

(58) Field of Classification Search
CPC . H02P 3/08; H02P 6/24; F16K 31/042; F16K 37/0041; F16K 3/22
See application file for complete search history.

(56) References Cited

U.S. PATENT DOCUMENTS

| | | |
|---|---|---|
| 3,209,225 A | 9/1965 | Shafi-Uddin |
| 3,305,714 A | 2/1967 | Plumpe, Jr. |
| 5,705,903 A | 1/1998 | Hastings |
| 6,906,493 B1 | 6/2005 | Ramirez, Jr. et al. |
| 8,022,656 B2 | 9/2011 | Puglisi |
| 2014/0151589 A1* | 6/2014 | Cox .................... G01D 5/2492 251/129.1 |
| 2020/0378526 A1* | 12/2020 | Nelson ................ F16K 37/0008 |
| 2021/0222790 A1* | 7/2021 | Park ...................... F16K 31/055 |
| 2022/0260084 A1* | 8/2022 | Mariano ............. F04D 27/0269 |

FOREIGN PATENT DOCUMENTS

| | | |
|---|---|---|
| JP | 5014916 B2 | 8/2012 |
| KR | 101990643 B1 | 6/2019 |

* cited by examiner

*Primary Examiner* — Zoheb S Imtiaz
(74) *Attorney, Agent, or Firm* — Seed IP Law Group LLP (57) ABSTRACT

A valve actuator includes a motor, an AC power source, a DC braking system, and a control system. The control system is configured to control the AC power source to apply an AC voltage to the motor to drive a valve toward a closed position. The control system is configured to disconnect the AC voltage from the motor before the valve reaches the closed position. The control system is configured to control the DC braking system to apply a DC voltage to the motor to stop motion of the valve.

19 Claims, 6 Drawing Sheets

VALVE ACTUATOR WITH DC BRAKING SYSTEM

BACKGROUND

Technical Field

The present disclosure generally relates to valve actuator assemblies.

Description of the Related Art

Valve actuators are often used to open and close valves. Valve actuators can be used in a wide range of settings, including in watercraft, wastewater treatment plants, refineries, power plants, and factories. Valve actuators apply force to operate valves along a range of motion from an open position to a closed position and vice versa. The force applied to the valve by the valve actuator may be a force to create linear movement of the valve, or torque applied to a shaft or other rotating part coupled to the valve to create rotational movement of the valve.

The valve actuator closes the valve by driving the valve to a position that prevents the flow of fluid in a fluid channel. In the example of a gate valve and various other types of valves, the valve actuator drives an end of the valve gate from a first side of the fluid channel to a second side of the fluid channel until the end of the valve gate contacts the second side of the fluid channel, nests it in a valve seat, and completely prevents fluid flow through the fluid channel.

Large forces or torques may be used to drive the valve to the closed position. In some cases, the valve actuator can drive the valve gate with too much force after it has nested in its vale seat far and can damage the fluid channel or the valve. Furthermore, the gate may become lodged in the valve seat and may not be able to be withdrawn.

BRIEF SUMMARY

Embodiments of the present disclosure provide a valve actuator that can reliably drive a valve to close off a fluid channel without damaging the valve or the fluid channel. Embodiments of the present disclosure provide a valve actuator that includes a DC braking system that assists in ensuring that a valve arrives at the closed position without damaging the valve or the fluid channel.

The valve actuator applies an AC voltage to a motor coupled to the valve. The AC voltage causes the motor to drive the valve toward the closed position. When the valve is near the fully closed position, a control system disconnects the AC voltage from the motor. After disconnecting the AC voltage from the motor, the control system connects a DC voltage from the DC braking system to the motor. The DC voltage act as a brake that stops the motion of the motor and the valve. By the time the DC voltage has stopped the valve, the valve is seated in the closed position. This ensures that the valve gate will not be too forcefully driven into the seating surface of the fluid channel.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. In some drawings, the sizes and relative positions of elements are not necessarily drawn to scale. For example, some of these elements may be enlarged and positioned to improve drawing legibility.

DETAILED DESCRIPTION

For most valves, there is a defined path of travel for the valve between two end points. For example, if the valve is in an open position, a force can be applied to the valve (e.g., via an actuator or hand wheel controlling the valve) to close the valve. The valve is moved from the first open position and travels along its path until it is seated in a second, closed position. The movement of the valve along its path may occur through translation or rotation of the valve. As such, when designing a valve actuator to control a valve, there are several design considerations. For example, more torque or force is generally needed to seat a valve or to remove a valve from its seated position (e.g., to unseat a valve) than is needed to move the valve through most of its travel path due to the forces associated with seating the valve, which may include pressure along the line of fluid in which the valve operates, close tolerances between the valve body or seal and the disk (which prevents leakage of the valve in the closed, seated position), or other issues of the mechanical configuration of the valve. In some cases, the preferred torque to seat the valve can be upwards of 10 times the preferred torque to move the valve along its travel path.

In addition, the design specifications of certain systems that utilize valves and valve actuators typically include a preferred time of operation. In some cases, the valve is preferably moved along its travel path from the open position to the closed position in 30 seconds, while in other cases, the operational time of the valve may be as little as 2 seconds or less.

Additionally, the inertial properties of the motors or other sources of torque are considered in designing the actuator. For example, when a rotor of a motor is inactivated, the rotor may continue to spin because of the inertia in the rotor, which will continue carrying the valve through its path after the motor is inactive. Such inertial forces can result in damage to the mechanical components (e.g., the valve), or even jamming of the valve in the seated, closed position.

It is contemplated in the present disclosure to provide a valve actuator that includes a DC braking system to supplement braking of the motor and the valve as the valve approaches the seated position. The motor may be primarily driven with an AC voltage. The AC voltage is applied to the motor to drive the valve toward the seated or closed position. When the valve is at a threshold distance from the fully seated position, the AC voltage is disconnected from the motor. The DC braking system is then connected to the motor. The DC braking system applies a DC voltage to the motor that rapidly stops rotation of the motor and motion of the valve. The valve arrives at the seated position as the motor comes to a stop.

Because the DC braking system can very rapidly stop rotation of the motor and the inertia of the valve, the motor can be utilized to rapidly drive the valve to the closed position, at which point the DC braking system can rapidly stop motion of the motor and the valve. This results in both a decrease in the total time to close the valve and a decrease in the risk that the valve will be forcefully lodged in the seated position.

In one embodiment, the motor includes a plurality of stator coils and a rotor. The rotor is driven by applying AC voltages to the stator coils. The rotor is mechanically coupled to the valve such that rotation of the rotor causes movement of the valve. When the motor has driven the valve nearly to the fully seated position, the AC voltage is disconnected from the stator coils. After the AC voltage has been disconnected from the stator coils, the DC braking system provides a DC voltage to one or more of the stator coils. The applied DC voltage quickly stops motion of the rotor and the valve at the seated position.

In one embodiment, the valve actuator includes a sensor and a control system. The sensor directly or indirectly senses the position of the valve. The sensor outputs sensor signals indicative of the position of the valve. The valve actuator includes a control system that receives the sensor signals. When the sensor signals indicate that the valve has been driven to a prescribed position, nearly to the fully seated position, the control system disconnects the AC power source from the stator coils of the motor. The control system then connects the DC power source to one or more of the stator coils of the motor providing resistance to rotor rotation as the valve reaches its closed position.

Figure 1:
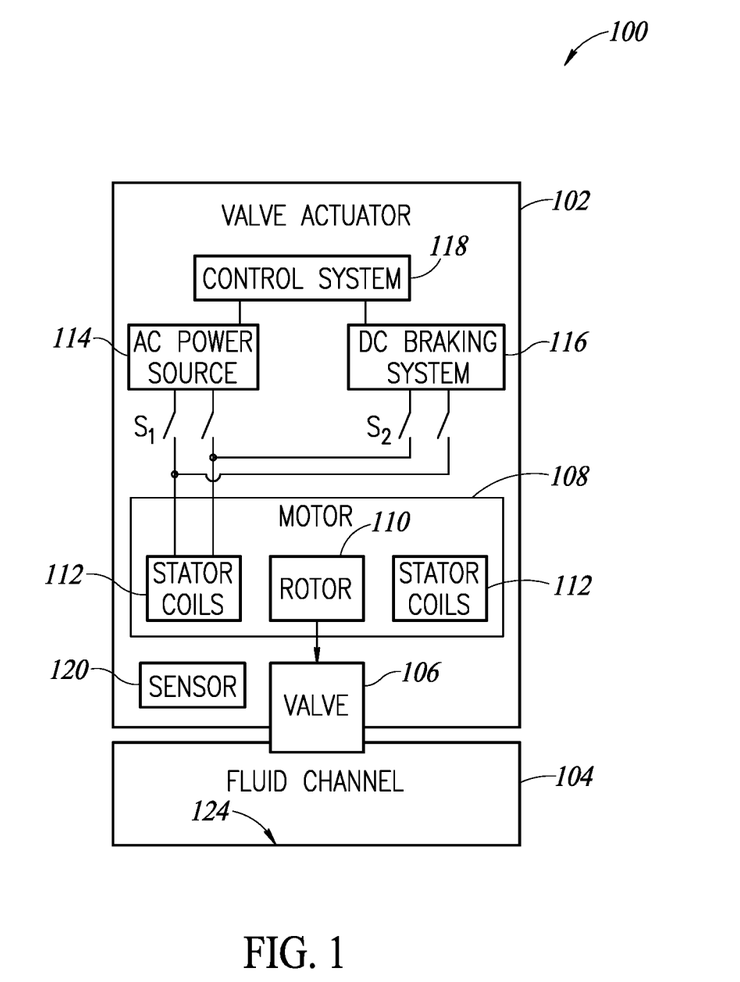
FIG. 1 is a block diagram of a valve system 100, in accordance with one embodiment.

FIG. 1 is a block diagram of a valve system 100 including valve actuator 102, in accordance with one embodiment. The valve actuator 102 controls fluid flow through the fluid channel 104. More particularly, the valve actuator 102 controls a valve 106 that opens and closes the fluid channel 104. As will be set forth in more detail below, the valve actuator 102 facilitates efficient and safe seating and unseating of the valve 106 to close the fluid channel 104.

The valve actuator 102 includes a motor 108 coupled to the valve 106. The motor 108 drives movement of the valve 106. In particular, when the fluid channel is to be closed, the motor 108 drives the valve 106 into the fluid channel 104 until the valve 106 is seated against a seating surface 124 of the fluid channel 104. When the fluid channel 104 is to be opened, the motor 108 drives the valve away from the seating surface 124 of the fluid channel 104 to an open position that enables a desired amount of fluid flow through the fluid channel 104.

In one embodiment, the motor 108 includes a rotor 110. The rotor 110 is mechanically coupled to the valve 106 such that rotation of the rotor 110 causes movement of the valve 106. The rotor 110 may be coupled to the valve 106 by gears, shafts, or other drivetrain components that enable rotation of the rotor 110 to drive motion of the valve 106. The rotor 110 can be rotated in a first direction to drive the valve 106 toward the seated or closed position. The rotor 110 can be rotated in a second direction to drive the valve 106 away from the seated or closed position.

In one embodiment, the motor 108 includes one or more stator coils 112. The stator coils 112 can be driven with an AC voltage to generate a magnetic field. The magnetic field causes rotation of the rotor 110. The motor 108 may include three stator coils 112 that operate in a three-phase configuration. In other cases, the motor 108 includes a single stator coil and operates in a single-phase configuration. While the present disclosure describes embodiments in which a motor 108 includes stator coils 112 and a magnetized rotor 110, other configurations of a motor 108 can be utilized without departing from the scope of the present disclosure.

The valve actuator 102 includes an AC power source 114. The AC power source 114 can be selectively connected to the stator coils 112 of the motor 108 by one or more first switches or relays S1. The AC power source 114 provides an AC voltage to the stator coils 112. Said another way, the AC power source 114 may drive an AC current through the stator coils 112. In practice, the AC power source 114 may provide a three-phase AC voltage to the stator coils 112. For example, there may be three stator coils 112. The AC power source 114 may provide, to each individual stator core 112, a respective AC voltage. The respective AC voltages have the same amplitude and frequency, but are mutually 120° out of phase with each other. Alternatively, the AC power source 114 may provide a single-phase AC voltage to a single stator coil 112 or to multiple stator coils 112.

The AC power source may correspond to one or more sets of wires that carry an AC voltage or multiple phases of AC voltage. The AC power source may also include other components facilitate providing the AC voltage or driving an AC current through the stator coils 112 of the motor 108.

The valve actuator 102 includes a DC braking system 116. The DC braking system 116 can be selectively connected to one or more of the stator coils 112 of the motor 108 by one or more second switching devices such as a switches, relays, FETs, or other switching devices S2. The first and second switching devices S1 and S2 are controlled such that the AC power source 114 and the DC braking system 116 are never both coupled to the stator coils 112 at the same time. The DC braking system 116 provides a DC voltage to one or more of the stator coils 112 of the motor 108. Applying the DC voltage to the one or more stator coils 112 has the effect of rapidly stopping motion of the rotor 110. Accordingly, the DC braking system 116 acts as a brake for the rotor 110 in order to rapidly stop motion of the rotor 110. Because the rotor 110 is mechanically coupled to the valve 106, the DC braking system 116 acts as a brake for the valve 106. The DC voltage may be applied to one of the stator coils 112, to all of the stator coils 112, or to a subset of the stator coils 112. Further details regarding the DC braking system 116 are provided below.

The valve actuator 102 includes a control system 118. The control system 118 controls the operation of the AC power source 114 and the DC braking system 116. Though not shown in FIG. 1, the control system 118 may be coupled to and may control the operation of the first and second switching devices S1 and S2. The control system 118 may selectively connect and disconnect the AC power source 114 and the DC braking system 116 from the motor 108.

The control system 118 may include one or more processors and one or more memories. The one or more memories may store software instructions related to the overall operation of the valve actuator 102. The software instructions may include instructions for controlling the AC power source 114 and the DC braking system 116. The memory may include data values related to positions and functions of the valve 106, the motor 108, the AC power source 114, and the DC braking system 116. The one or more processors may execute the software instructions and may otherwise read data from the one or more memories. Execution of the software instructions causes the control system 118 to control the motor 108, the AC power source 114 and the DC power source 116.

In practice, the control system 118 may include multiple individual control systems or control modules. Each individual control system or control module may control a component of the valve actuator 102. For example, a portion of the control system 118, such as a control unit, may be included in the DC braking system 116.

The valve actuator 102 includes a sensor 120. The sensor 120 is configured to sense a position of the valve 106. The sensor 120 generates sensor signals indicative of the position of the valve 106.

The sensor 120 is coupled to the control system 118. The sensor 120 can provide sensor signals to the control system 118. The control system 118 can analyze the sensor signals and can control connection and disconnection of the AC voltage and the DC braking voltage from the stator coils 112 responsive to the sensor signals provided by the sensor 120.

In one embodiment, the sensor 120 is a potentiometer coupled to the valve 106. The resistance of the potentiometer changes based on the position of the valve 106. In some cases, the resistance of the potentiometer may have a one-to-one correspondence with the position of the valve 106. The resistance of the potentiometer affects the output of a voltage divider which is used to indicate the current position of the valve 106.

In one embodiment, the control system 118 includes a lookup table. The lookup table includes a plurality of potentiometer-driven voltage values and a plurality of valve position values. Each potentiometer-driven voltage value is paired with a respective valve position value. Accordingly, as the control system 118 receives potentiometer-driven voltage values, the control system 118 refers to the lookup table and compares the current potentiometer-driven voltage value to the potentiometer resistance value stored in the lookup table. The control system 118 may identify in the lookup table the potentiometer resistance value that most closely matches the current potentiometer resistance value. The control system may then refer to the corresponding valve position value to determine or estimate the current position of the valve 106. In this way, the control system 118 can determine the current position of the valve based on the current potentiometer resistance value.

When referring to the lookup table, the control system 118 may be configured to identify in the lookup table the closest potentiometer-driven voltage value that is greater than the current potentiometer-driven voltage value. Alternatively, the control system 118 may be configured to identify in the lookup table the closest potentiometer-driven voltage value that is lower than the current potentiometer-driven voltage value.

The sensor 120 can include sensors other than potentiometers. The sensor 120 can include any suitable type of sensor that can determine the current position of the valve 106 and can output sensor signals, or can otherwise provide an indication of the current position of the valve 106.

In one embodiment, the control system 118 includes a threshold valve travel distance. When a command is received to close the valve 106, the control system 118 connects the AC power source 114 to the stator coils 112 of the motor 108. The control system 118 monitors the position of the valve based on the sensor signals from the sensor 120. When the sensor signals indicate that the valve 106 has traveled a threshold distance toward the closed position, the control system 118 disconnects the AC power source 114 from the stator coils 112. After the control system 118 disconnects the AC power source 114 from the stator coils 112, the control system 118 connects the DC braking system 116 to the stator coils 112. The control system 118 causes the DC braking system 116 to apply a DC voltage to one or more of the stator coils 112 of the motor 108. The application of the DC voltage causes the motor 108 to stop. More particularly, the DC voltage causes the rotor 110 to stop. When the rotor 110 stops, the valve 106 also stops.

During application of the DC voltage, the motor 108 and the valve 106 continue to move for a brief amount of time due to the inertia of the motor rotor 1108 and the valve 106. Accordingly, the threshold gate travel distance can be selected so that the residual motion of the valve 106 during application of the DC braking voltage brings the valve 106 to the fully closed position. The proper threshold distances, AC voltage amplitude, and DC voltage amplitude can be determined through testing and calibration The control system 118 may implement a delay between disconnecting the AC power source 114 and connecting the DC braking system 116. After the control system 118 disconnects the AC power source 114 from the motor 108, the control system 118 waits a selected duration of time before connecting the DC braking system 116 to the motor 108. This delay time can allow the induced current through the stator coils to dissipate and prevent the braking system from creating potentially damaging transient voltages. This delay can also ensure that there are no short circuits between the AC power source 114 and the DC braking system 116. In one example, the delay between disconnecting the AC power source 114 and connecting of the DC braking system 116 is between 10 ms and 500 ms, though other delay values can be utilized without departing from the scope of the present disclosure.

In one embodiment, the control system 118 implements a delay between connecting a first rail of the DC braking system 116 to the stator coils 112 and connecting a second rail of the DC braking system 116 to the stator coils 112. For example, after the initial delay subsequent to disconnecting the AC power source 114, the control system 118 may connect a high DC rail of the DC power source 116 to the stator coils 112. The control system 118 may then wait for a second delay period before connecting low DC rail of the DC power source 116 to the stator coils 112. Alternatively, the control system 118 may first connect the low DC rail and may then connect the high DC rail after the second delay period. The second delay period may be between 10 ms and 100 ms, though other delay values can be implemented without departing from the scope of the present disclosure.

The control system 118 may implement multiple steps of driving the motor 108 and braking in order to close the valve 106. In this case, the control system 118 may implement multiple threshold travel distances. The control system 118 may connect the AC power source 114 to the stator coils 112 with a first voltage amplitude until the valve 106 has traveled to the first threshold travel distance. The control system 118 may then apply the DC braking system 116 to the motor 108 until the sensor 120 indicates that the valve 106 has stopped. The control system 118 may then connect the AC power source 114 to the stator coils 112 at a second AC voltage amplitude lower than the first AC voltage amplitude, until the sensor signals indicate that the valve 106 has passed the second threshold distance. The control system 118 may then connect the DC braking system 116 to the motor 108 until the motor 108 has stopped. This may continue through multiple different threshold stopping distances until a final threshold stopping distance has been surpassed or achieved. The control system 118 may apply the DC braking system 116 for a final time.

In one embodiment, the control system 118 implements multiple threshold travel distances. Rather than continuously monitoring the position of the valve 106, the control system 118 applies the AC power source 114 for a selected period of time and then applies the DC braking system 116. After applying the DC braking system 116, the control system 118 monitors the sensor 120 to determine if the valve 106 has passed the first threshold travel distance. If the valve 106 has not passed the first threshold travel distance, then the control system 118 applies the AC power source 114 at the first AC voltage amplitude to the motor 108 for a selected period of time. The cycles of applying the first AC voltage amplitude and then applying the DC braking system 116 continue until the sensor 120 indicates the valve 106 has passed the first threshold distance. After the valve 106 has passed the first threshold distance, the control system 118 applies the AC power source 114 at a second, lower AC voltage amplitude for a selected duration of time. The control system 118 then connects the DC braking system 116 and checks whether the valve 106 has passed a second threshold travel distance. The control system 118 may implement multiple cycles of the second AC voltage amplitude and DC braking until the second threshold travel distance has been crossed. The cycles of reduced AC voltage amplitudes and braking may continue until a final threshold travel distance has been crossed.

The control system 118 can also implement the DC braking system 116 when moving the valve 106 from the closed position to an open position to enable fluid flow through the fluid channel 104. The control system 118 can implement the DC braking system 116 in substantially the same manner as described above. This can help ensure that the valve 106 is not driven forcibly beyond the desired open position.

The control system 118 can also implement the DC braking system 116 when moving the valve 106 to a desired intermediate position. In some cases, it may be beneficial to move the valve 106 to a position that is neither fully open nor fully closed. Such a position may be used when a particular reduced flow rate or increased pressure is desired within the fluid channel 104. The control system 118 can utilize the DC braking system 116 as described above in moving the valve 106 to the desired intermediate position.

Figure 2A:
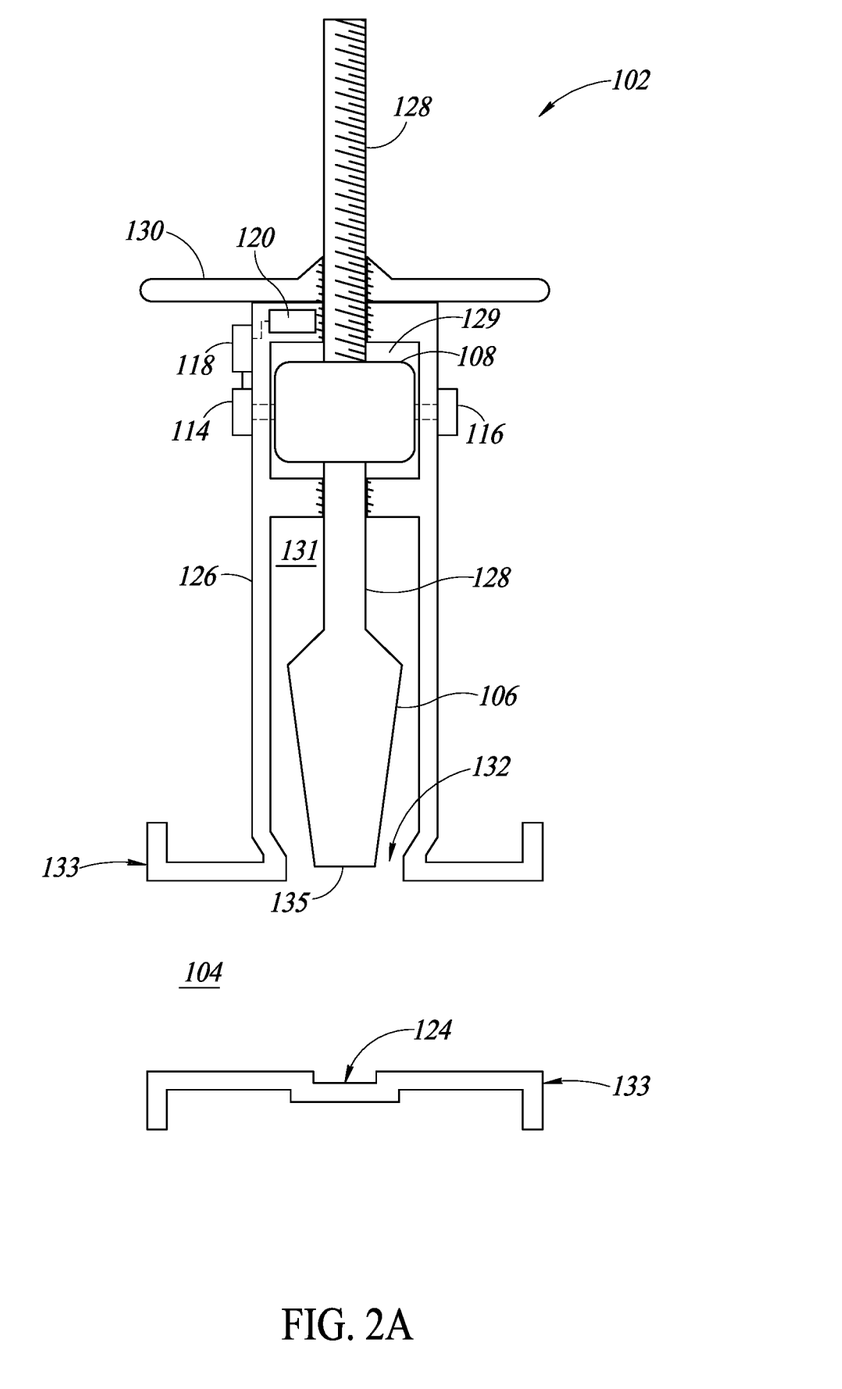
FIG. 2A is an illustration of a valve system with a valve in an open position, in accordance with one embodiment.

FIG. 2A is a cross-sectional illustration of a valve actuator 102 with a valve 106 at an open position such that fluid can flow through the fluid channel 104, in accordance with one embodiment. The valve actuator 102 includes a housing 126. The housing 126 includes a first interior portion 129 and a second interior portion 131. A motor 108 is positioned within the first portion 129. A shaft 128 extends through the first portion 129 and the second portion 131. The motor 108 is coupled to the shaft 128. Though not shown in FIG. 2A, the valve actuator 102 may include a gear train coupled between the motor 108 and the shaft 128.

A valve 106 is positioned at the end of the shaft 128. The housing 126 includes an aperture through which the valve 106 can pass into the fluid channel 104. The valve 106 can be driven through the aperture 132 into the fluid channel 104 toward a seating surface 124. When the end 135 of the valve 106 is positioned at the seating surface 124, the valve 106 is in the closed position and the fluid channel 104 is closed such that fluid will not flow through the fluid channel 104.

The housing 126 includes a mounting assembly 133. The mounting assembly 133 can be utilized to mount the housing 126 to a pipe, tube, or other fluid carrying body. Various other configurations of a mounting assembly 133 can be utilized without departing from the scope of the present disclosure.

The valve actuator 102 includes a control system 118, an AC power source 114, and a DC braking system 116 mounted to the housing 126. One or more of the control system 118, the AC power source 114, and the DC braking system 116 may be positioned in the housing 126. In some cases, the control system 118, the AC power source 114, and the DC braking system 116 may be positioned in a separate housing mounted to the housing 126. Various other configurations of the control system 118, AC power source 114, and the DC braking system 116 can be utilized without departing from the scope of the present disclosure.

The valve actuator 102 includes a sensor 120 positioned within the housing 126. As described previously, the sensor 120 can sense the position of the valve 106. The sensor 120 can provide sensor signals to the control system 118 indicating the position of the valve 106.

The valve actuator 120 includes a hand wheel 130 coupled to the shaft 128. The hand wheel 130 can be manipulated manually to move the valve 106 to the open or closed position.

As described in relation to FIG. 1, the valve actuator 102 can utilize the DC braking system 116 to assist in moving the valve 106 safely and efficiently to the closed position. The valve actuator 102 can also utilize the DC braking system 116 in moving the valve 106 to the open position or to an intermediate position.

FIG. 2A illustrates one embodiment of a valve actuator 102 and a valve assembly in accordance with principles of the present disclosure. However, various other shapes, configurations, and valve types can be utilized without departing from the scope of the present disclosure.

Figure 2B:
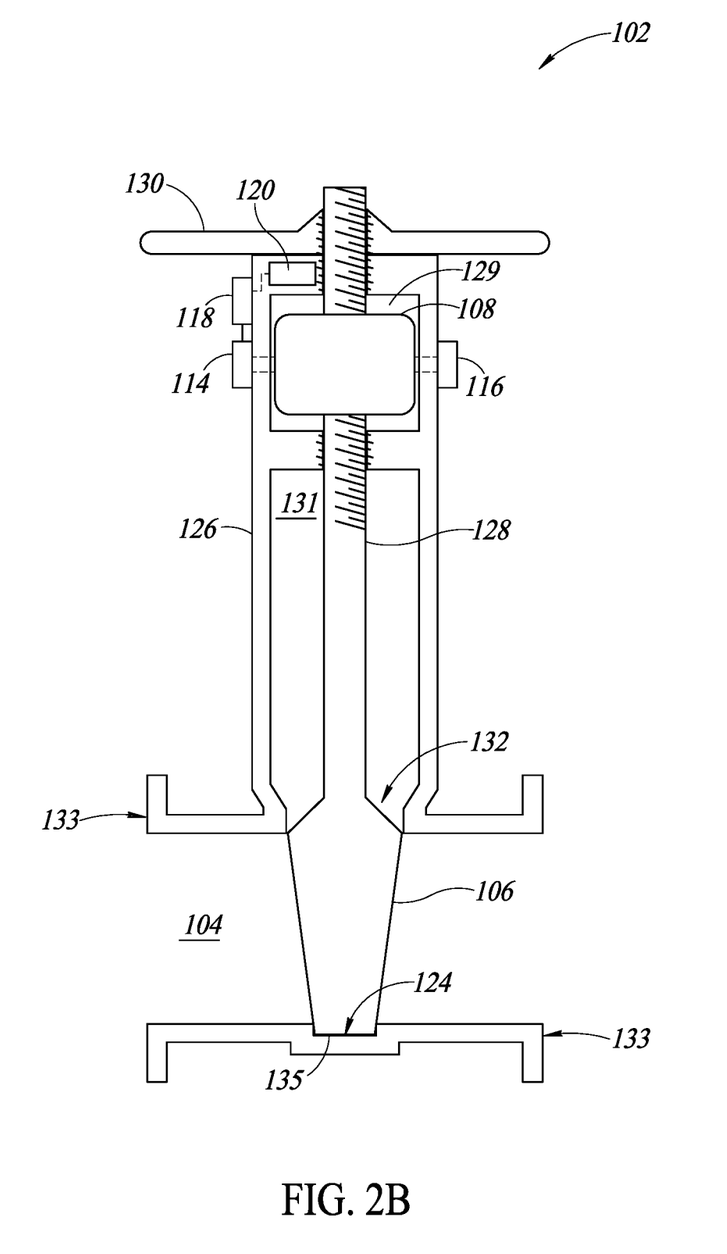
FIG. 2B is an illustration of the valve system of FIG. 2A with the valve in a closed position, in accordance with one embodiment.

FIG. 2B is an illustration of the valve actuator 102 and valve assembly of FIG. 2A, except that the valve 106 is in the closed position. In particular, the end 135 of the valve 106 is in contact with the seating surface 124. The fluid channel 104 is closed. With the help of the DC braking system 116 and the control processes described above, the valve actuator 102 can seat the valve at the seating surface 124 without damaging the valve 106 or the seating surface 124.

Figure 3:
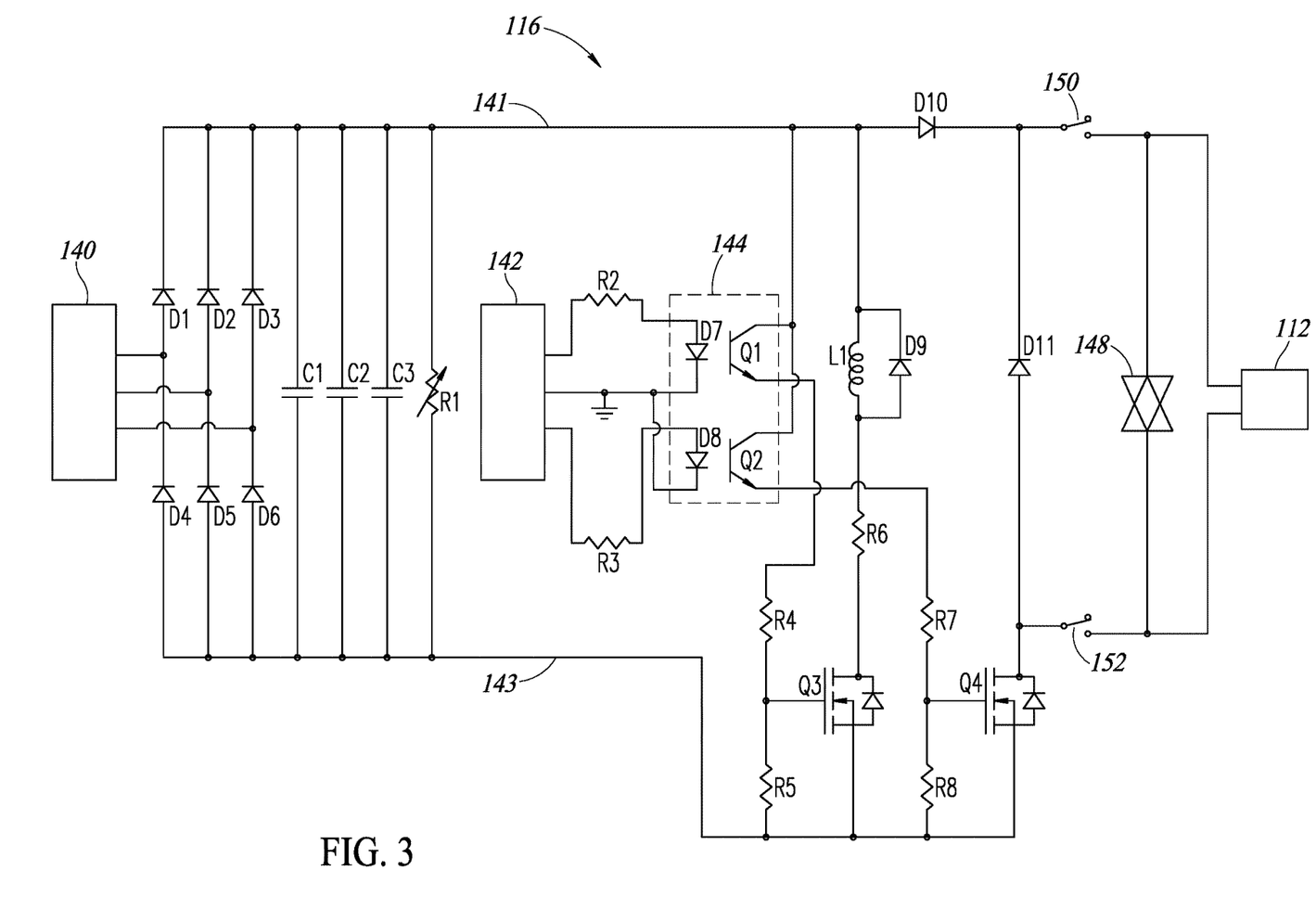
FIG. 3 is a circuit diagram of a DC braking system, in accordance with one embodiment.

FIG. 3 is a schematic diagram of a DC braking system 116, in accordance with one embodiment. The DC braking system 116 can be implemented on one or more circuit boards or other mounting or housing systems. The DC braking system 116 may include portions of the control system 118. Alternatively, the DC braking system 116 may include components that communicate with the control system 118.

The DC braking system 116 includes an electrical connection 140. The electrical connection 140 receives a three-phase voltage from the AC power source 114, or from another power source. In one embodiment, the electrical connection 140 receives a three-phase voltage via a transformer connected between the AC power source 114 and the DC braking system 116. The transformer may be a step-up or step-down transformer.

The DC braking system 116 includes diodes D1-D6 coupled to the connection circuit 114. Diodes D1 and D4 correspond to a first pair diodes. Diodes D2 and D5 correspond to a second pair diodes. Diodes D3 and D6 correspond to a third pair diodes. The cathode of the diode D4 and the anode of the diode D1 are coupled to a first AC voltage output of the connection circuit 140. The cathode of the diode D5 and the anode of the diode D2 are coupled to a second AC voltage output of the connection circuit 140. The cathode of the diode D6 and the anode of the diode D3 are coupled to a third AC voltage output of the connection circuit 140.

The DC braking system 116 also includes capacitors C1-C3 connected in parallel with each other and with the pairs of diodes. The capacitors C1-C3 and the diodes D1-D6 collectively function as a rectifier that rectifies the three-phase voltage received by the connection circuit 140 and provides a DC voltage. The cathodes of the diodes D1-D3 correspond to a high voltage rail 141 of the DC braking system 116. The anodes of the diodes D4-D6 correspond to a low-voltage rail 143 of the DC braking system 116. The voltage between the high and low voltage rails corresponds to the DC voltage of the DC braking system 116. A variable resistance resistor R1 is coupled between the high voltage rail 141 and the low-voltage rail 143. Resistor R1 dissipates potentially circuit damaging capacitor charge that remains in the circuit after AC power has been switched off.

The output of the DC braking system 116 is coupled to a stator coil 112. More particularly, the high voltage rail 141 and the low-voltage rail 143 are coupled to the stator coil 112. The high voltage rail and the low-voltage rail may be connected to each of the stator coils 112 of the motor 108 or to a subset of the stator coils 112 of the motor 108. As will be set forth in more detail below, the DC voltage is selectively applied to the stator coils 112 by operation of relays, transistors, and control signals.

The DC braking system 116 includes a switching devices 150 and 152. The switching devices 150 can selectively connect and disconnect the high voltage rail 141 to the stator coils 112. The switching devices 152 can selectively connect the low-voltage rail 143 to the stator coils 112.

The DC braking system includes bipolar transistors Q1 and Q2. The DC braking system also includes power MOSFET transistors Q3 and Q4. The transistor Q4 can be operated to selectively connect the low-voltage rail 143 to the stator coils 112. In particular, the current path between the low-voltage rail 143 and the stator coils 112 flows through the source and drain terminals of the transistor Q4. The source terminal of the transistor Q4 is coupled to the low-voltage rail 143. The drain terminal of the transistor Q4 is coupled to the stator coils 112 via the switching devices 152. When a high voltage is applied to the gate terminal of the transistor Q4, the transistor Q4 is enabled and the low-voltage rail 143 can be coupled to the stator coils 112 via the relay 152. The control function of the gate terminal of the transistor Q4 will be described in greater detail below.

The gate terminal of the transistor Q4 is coupled to the emitter terminal of the bipolar transistor Q2 via a resistor R7. The collector terminal of the bipolar transistor Q2 is coupled to the high voltage rail 141. A resistor R8 is coupled between the gate terminal of the transistor Q4 in the low-voltage rail 143.

The gate terminal of the transistor Q3 is coupled to the emitter terminal of the bipolar transistor Q1 via a resistor R4. The collector terminal of the bipolar transistor Q1 is coupled to the high voltage rail 141. The source terminal of the transistor Q3 is coupled to the low-voltage rail 143. The drain terminal of the transistor Q3 is coupled to a resistor R6. An inductor L1 and a diode D9 are coupled in parallel between the resistor R6 and the high voltage rail 141. The inductor L1 corresponds to a relay coil. A resistor R5 is coupled between the gate terminal of the transistor Q3 and the low-voltage rail 143.

The DC braking system 116 includes a control circuit 142. The DC braking system 116 also includes a resistor R2 coupled to a first output of the control circuit 142. A second output of the control circuit 142 is coupled to ground. The DC braking system 116 includes a resistor R3 coupled to a third output of the control circuit 142. The DC braking system 116 includes a diode D7 physically adjacent to the base of the transistor Q1 and having an anode coupled to the resistor R3 and a cathode coupled to ground. The DC braking system 116 includes a diode D8 physically adjacent to the base of the transistor Q2 and having an anode coupled to the resistor R3 and the cathode coupled to ground.

The diodes D7 and D8 are photodiodes. The transistors Q1 and Q2 include base terminals of a photosensitive semiconductor material adjacent to the light emitting diodes D7 and D8. The diodes D7 and D8 and the transistors Q1 and Q2 correspond to an optoisolation circuit.

When the control system 118 determines that the low-voltage rail 143 should be connected to the stator coils 142, the control system one 118 causes the control circuit 142 to output a high voltage on the third output terminal. This causes a current to flow through the light emitting diode D8. The light emitting diode D8 outputs light. The base terminal of the transistor Q2 absorb some of the light output by the light emitting diode D8. The absorption of light by the base terminal of the transistor Q2 causes a current to flow between the collector terminal of the transistor Q2 and the emitter terminal of the transistor Q2. This causes the voltage at the gate terminal of the transistor Q4 to go high, thereby turning on the transistor Q4 and coupling the low-voltage rail 143 to the stator coil 146.

The control system 118 can cause the transistor Q3 to turn on by causing the control circuit 142 to output a high voltage on the first output terminal of the control circuit 142. When the control circuit 142 outputs a high voltage, a current flows through the light emitting diode D7, causing the light emitting diode D7 to emit light. The photosensitive base terminal of the transistor Q1 receives the light and turns on, causing a current to flow from the collector to the emitter and causing the gate terminal of the transistor Q3 to go high, turning on the transistor Q3. Turning on the transistor Q3 enables current to flow through the relay coil L1.

The DC braking system 116 includes a diode having an anode coupled to the high voltage rail 141 and the cathode coupled to the relay 150. The DC braking system 116 includes a diode D11 having an anode coupled to the drain terminal of the transistor Q4 and a cathode coupled to the cathode of the diode D10. The DC braking system includes a transmission gate 148 coupled between the relays 150 and 152.

The DC braking system 116 can selectively supply the DC voltage to the stator coils 112. The DC braking system generates the DC voltage by rectifying the three-phase voltage received by the selection circuit 140. When the DC voltage is to be applied to the stator coils 112, the control circuit 118 controls the relay 150 to connect the high-voltage rail 141 to the stator coils 112. After a brief delay, as described previously, the control system 118 causes the relay 152 to connect the low-voltage rail 143 to the stator coils 112. The control circuit 118 also causes the control circuit 142 to turn on the transistor Q4, in order to supply the low-voltage rail to the stator coils 112. When the high-voltage rail and the low-voltage rail are both connected to the stator coils 112, the DC voltage is supplied across the stator coils 112, creating a static magnetic field within the stator coil, creating drag on the rotor, causing the motor to stop. In this way, the DC braking system 116 can supply the DC voltage to the stator coils 112, causing the rotor 110 of the motor 108 to stop. Other configurations of a DC braking system 116 can be implemented without departing from the scope of the present disclosure.

Figure 4:
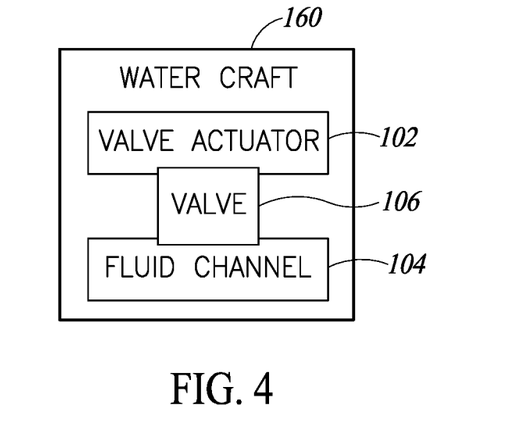
FIG. 4 is a block diagram of a watercraft, in accordance with one embodiment.

FIG. 4 is a block diagram of a watercraft 160, according to one embodiment. The watercraft 160 includes a valve actuator 102, a fluid channel 104, and the valve 106. The valve actuator 102, the fluid channel 104, and the valve 106 can include components, functions, structures, and processes as described in relation to FIGS. 1-3. Watercraft can include a boat, ship, or other type of watercraft capable of carrying people and cargo on the river, a lake, the sea, or an ocean.

Figure 5:
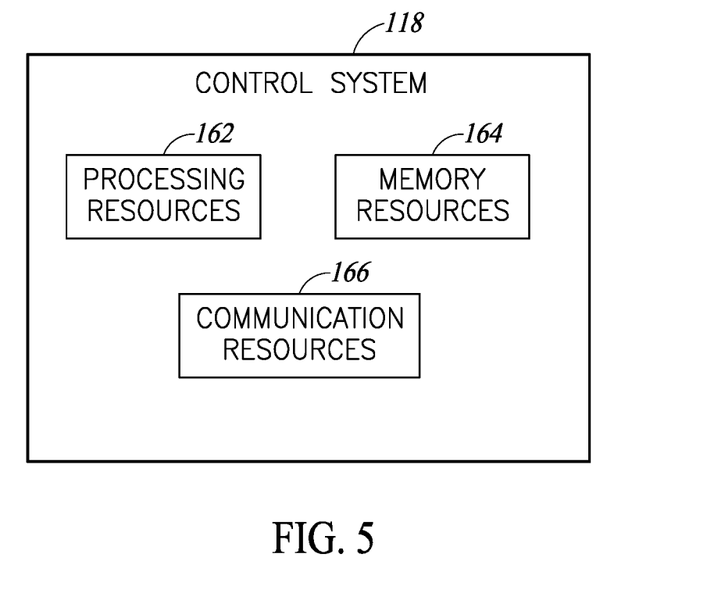
FIG. 5 is a block diagram of a control system, in accordance with one embodiment.

FIG. 5 is a block diagram of a control system 118, in accordance with one embodiment. The control system 118 can include components, functions, and processes as described in relation to FIGS. 1-4. The control system 118 includes processing resources 162, memory resources 164, and communication resources 166. The processing resources 162 can include one or more processors, microcontrollers, microprocessors or other computing resources. The memory resources 164 can include one or more memories, such as computer readable media that store software instructions for executing functions associated with the control system 118 as described previously. The processing resources 162 can execute the instructions stored in the memory resources 164 and can otherwise store and retrieve data from the memory resources 164. The communication resources 166 can include resources for communicating in a wired manner and/or in a wireless manner between components of the control system 118 and between components and systems external to the control system 118.

Figure 6:
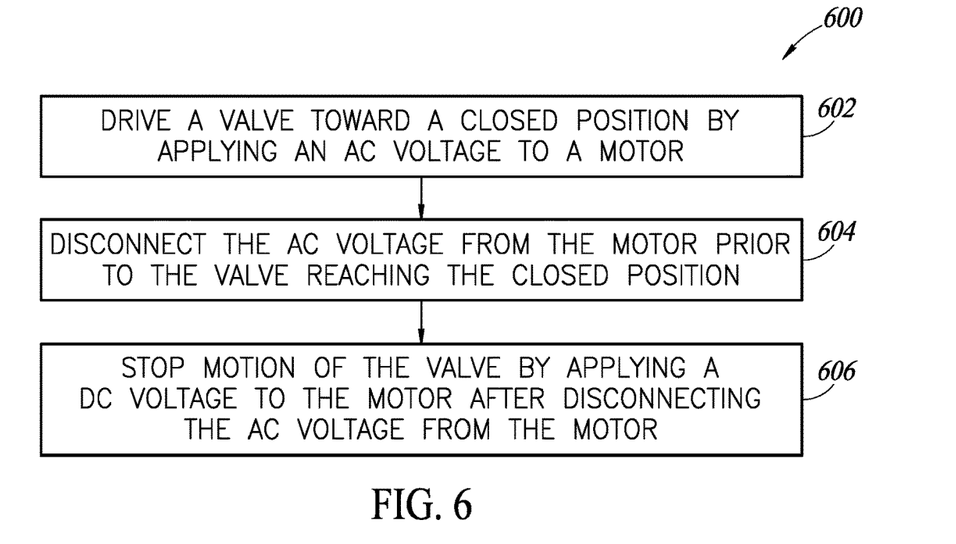
FIG. 6 is a flow diagram of a method for operating a valve actuator, in accordance with one embodiment.

FIG. 6 is flow diagram of a method 600 for operating a valve. The method 600 can include components, systems, and processes described in relation to FIGS. 1-3. At 602, the method 600 includes driving a valve toward a closed position by applying an AC voltage to a motor. At 604, the method 600 includes disconnecting the AC voltage from the motor prior to the valve reaching the closed position at 606, the method 600 includes stopping motion of the valve by applying a DC voltage to the motor after disconnecting the AC voltage from the motor.

Figure 7:
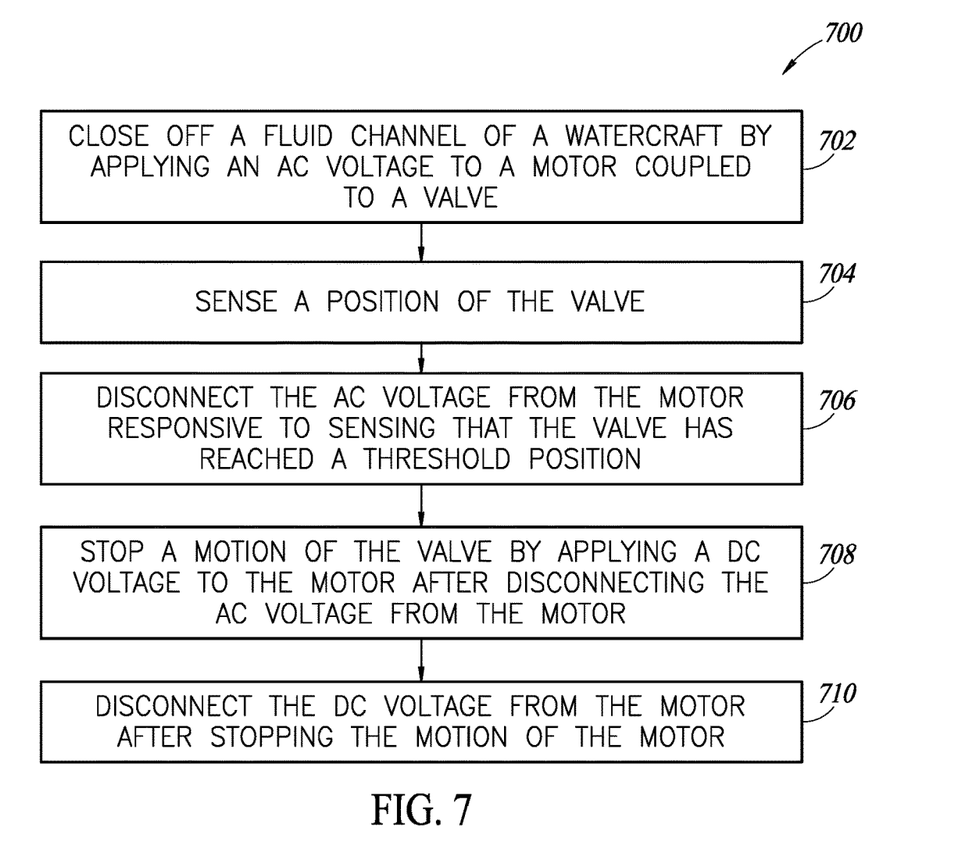
FIG. 7 is a flow diagram of a method for operating a valve actuator, in accordance with one embodiment.

FIG. 7 is flow diagram of a method 700 for operating a valve. The method 700 can include components, systems, and processes described in relation to FIGS. 1-4. At 702, the method 700 closing off a fluid channel of a watercraft by applying an AC voltage to a motor coupled to a valve. At 704, the method 700 includes sensing a position of the valve. At 706, the method 700 includes disconnecting the AC voltage from the motor responsive to sensing that the valve has reached a threshold position. At 708, the method 700 includes stopping a motion of the valve by applying a DC voltage to the motor after disconnecting the AC voltage from the motor. At 710, the method 700 includes disconnecting the DC voltage from the motor after stopping the motion of the motor.

In one embodiment, a method includes driving a valve toward a closed position by applying an AC voltage to a motor, disconnecting the AC voltage from the motor prior to the valve reaching the closed position, and stopping motion of the valve by applying a DC voltage to the motor after disconnecting the AC voltage from the motor.

In one embodiment, a valve actuator includes a motor, an AC power source configured to apply an AC voltage to the motor, a DC braking system configured to apply a DC voltage to the motor, and a control system. The control system is configured to control the AC power source to apply the AC voltage to the motor to drive a valve toward a closed position, to control the AC power source to disconnect the AC voltage from the motor before the valve reaches the closed position, and to control the DC braking system to apply the DC voltage to the motor to stop motion of the valve.

In one embodiment, a method includes closing off a fluid channel by applying an AC voltage to a motor coupled to a valve, sensing a position of the valve, and disconnecting the AC voltage from the motor responsive to sensing that the valve has reached a threshold position. The method includes stopping a motion of the valve by applying a DC voltage to the motor after disconnecting the AC voltage from the motor and disconnecting the DC voltage from the motor after stopping the motion of the motor.

In one embodiment, a system includes a fluid channel, a valve coupled to the fluid channel configured open and close the fluid channel, and a valve actuator coupled to the valve. The valve actuator includes a motor, an AC power source configured to apply an AC voltage to the motor, a DC braking system configured to apply a DC voltage to the motor, and a control system. The control system is configured to control the AC power source to apply the AC voltage to the motor to drive the valve toward a closed position, to control the AC power source to disconnect the AC voltage from the motor before the valve reaches the closed position, and to control the DC braking system to apply the DC voltage to the motor to stop motion of the valve.

In one embodiment, a non-transitory computer-readable medium having contents which configure a valve actuator to perform a method. The method includes, driving a valve toward a closed position by applying an AC voltage to a motor, disconnecting the AC voltage from the motor prior to the valve reaching the closed position, and stopping motion of the valve by applying a DC voltage to the motor after disconnecting the AC voltage from the motor.

In the above description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with valve actuator assemblies and methods and electric, hydraulic, or pneumatic motors have not been shown or described in detail to avoid unnecessarily obscuring descriptions of the embodiments.

As used herein, the term "valve" is broadly construed to include, but is not limited to, a device capable of regulating a flow of one or more substances by opening, closing, or partially blocking one or more passageways. For example, a valve can halt or control the flow of a fluid (e.g., a liquid, a gas, or mixtures thereof) through a conduit, such as a pipe, tube, line, duct, or other structural component (e.g., a fitting) for conveying substances. Valve types include ball valves, butterfly valves, globe valves, plug valves, gate valves, guillotine valves, and the like.

Further, as used herein, unless the context clearly dictates otherwise, the term "gear" is broadly construed to include a device for transferring force (e.g., torque, etc.) from one object to another, and includes, but is not limited to, devices with structures such as ribs, channels, teeth, splines, protrusions, extensions, projections, or other structural components to accomplish such transfer by meshing with another device having corresponding structures.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The relative terms "approximately" and "substantially," when used to describe a value, amount, quantity, or dimension, generally refer to a value, amount, quantity, or dimension that is within plus or minus 5% of the stated value, amount, quantity, or dimension, unless the content clearly dictates otherwise. It is to be further understood that any specific dimensions of components provided herein are for illustrative purposes only with reference to the exemplary embodiments described herein, and as such, the present disclosure includes amounts that are more or less than the dimensions stated, unless the context clearly dictates otherwise.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied outside of the valve actuator assembly context, and not necessarily the exemplary valve actuator assembly systems, methods, and devices generally described above.

The foregoing detailed description has set forth various embodiments of the devices and/or processes via the use of certain exemplary embodiments. Insofar as such embodiments contain one or more functions and/or operations, it will be understood by those skilled in the art that each function and/or operation within such embodiment can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more control systems (e.g., microcontrol systems) as one or more programs executed by one or more processors (e.g., microprocessors), as firmware, or as virtually any combination thereof.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), an optical disc memory (CD/DVD/Blu-ray), magnetic tape, and other nontransitory media.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   driving a valve toward a closed position by applying an AC voltage to a motor with a first switching device;
   disconnecting the AC voltage from the motor prior to the valve reaching the closed position; and
   stopping motion of the valve by applying a DC voltage with a second switching device to the motor after disconnecting the AC voltage from the motor, wherein the motor is exclusively coupled to either the first switching device or the second switching device.

2. The method of claim 1, further comprising:
   sensing a position of the valve while driving the valve toward the closed position; and
   disconnecting the AC voltage from the motor responsive to the valve reaching a threshold position.

3. The method of claim 1, comprising waiting a first selected duration of time between disconnecting the AC voltage and applying the DC voltage.

4. The method of claim 1, wherein applying the DC voltage includes:
connecting a first DC rail to the motor; and
connecting a second DC rail to the motor a selected duration of time after connecting the first DC rail to the motor.

5. The method of claim 1, comprising disconnecting the AC voltage from the motor responsive to elapse of a selected duration of time after applying the AC voltage to the motor.

6. The method of claim 1, comprising:
after stopping motion of the valve, disconnecting the DC voltage from the motor; and
after disconnecting the DC voltage from the motor, driving motion of the valve further toward the closed position by again applying the AC voltage to the motor.

7. The method of claim 6, comprising, after driving the motion of the valve further toward the closed position:
disconnecting the AC voltage from the motor; and
stopping motion of the valve by applying the DC voltage to the motor after disconnecting the AC voltage from the motor.

8. The method of claim 1, wherein;
applying the AC voltage includes applying a multi-phase AC voltage to a plurality of stator coils of the motor; and
applying the DC voltage includes applying the DC voltage to only one of the stator coils of the motor.

9. The method of claim 1, wherein;
applying the AC voltage includes applying a multi-phase AC voltage to a plurality of stator coils of the motor; and
applying the DC voltage includes applying the DC voltage to the plurality of stator coils of the motor.

10. The method of claim 1, further comprising generating the DC voltage by rectifying the AC voltage.

11. A valve actuator, comprising:
a motor;
an AC power source configured to apply an AC voltage to the motor with a first switching device;
a DC braking system configured to apply a DC voltage to the motor with a second switching device, wherein the motor is exclusively coupled to either the first switching device or the second switching device; and
a control system configured to control the AC power source to apply the AC voltage to the motor to drive a valve toward a closed position, to control the AC power source to disconnect the AC voltage from the motor before the valve reaches the closed position, and to control the DC braking system to apply the DC voltage to the motor to stop motion of the valve.

12. The valve actuator of claim 11, comprising a sensor communicatively coupled to the control system and configured to generate sensor signals indicative of a position of the valve.

13. The valve actuator of claim 12, wherein the sensor includes a potentiometer.

14. The valve actuator of claim 12, wherein the control system is configured to disconnect the AC voltage from the motor responsive to the sensor signals indicating that the valve has reached a threshold position.

15. The valve actuator of claim 11, wherein the control system includes a lookup table matching each of a plurality of reference sensor signal values to a respective sensor position value.

16. The valve actuator of claim 11, wherein the motor includes a plurality of stator coils, wherein the DC braking system is configured to apply the DC voltage to all of the stator coils.

17. The valve actuator of claim 11, wherein the motor includes a plurality of stator coils, wherein the DC braking system is configured to apply the DC voltage to only one of the stator coils.

18. A method, comprising:
closing off a fluid channel by applying an AC voltage to a motor coupled to a valve;
sensing a position of the valve;
disconnecting the AC voltage from the motor responsive to sensing that the valve has reached a threshold position;
stopping a motion of the valve by applying a DC voltage to the motor after disconnecting the AC voltage from the motor, wherein applying the DC voltage includes:
connecting a first DC rail to the motor;
connecting a second DC rail to the motor for a selected duration of time after connecting the first DC rail to the motor; and
disconnecting the DC voltage from the motor after stopping the motion of the motor.

19. The method of claim 18, wherein the first DC rail is a positive rail and the second DC rail is a negative rail or a ground rail.

* * * * *